United States Patent [19]

Redman

[11] 4,039,260

[45] Aug. 2, 1977

[54] ROTATIONAL MOTION TRANSDUCER

[76] Inventor: Charles M. Redman, 2020 Huntington Drive, Las Cruces, N. Mex. 88001

[21] Appl. No.: 669,359

[22] Filed: Mar. 22, 1976

[51] Int. Cl.² .............................................. H01S 3/10
[52] U.S. Cl. ............................................ 356/106 LR
[58] Field of Search ................................ 356/106 LR

[56] References Cited

U.S. PATENT DOCUMENTS

| 3,320,850 | 5/1967 | Oliver | 356/106 LR |
| 3,743,962 | 7/1973 | Rosenberg | 356/106 LR |
| 3,890,047 | 6/1975 | Warner | 356/106 LR |

FOREIGN PATENT DOCUMENTS

| 1,955,911 | 12/1970 | Germany | 356/106 LR |
| 1,285,277 | 8/1972 | United Kingdom | 356/106 LR |

*Primary Examiner*—Vincent P. McGraw
*Attorney, Agent, or Firm*—Nathan Edelberg; Robert P. Gibson; Freddie M. Bush

[57] ABSTRACT

A fiber optical waveguide of the glass or single crystal types is formed into a loop or spiral with its ends joined to maximize optical or infrared single mode transmission. The waveguide is modified by doping or some other technique to lase when the loop or spiral is radiated with sufficient electromagnetic or optical energy. A single or multiturn ring laser is thus formed. The ring or spiral may be essentially in one plane. The frequency of lasing or oscillating is a factor of waveguide length. Two lasing frequency pickoffs spaced a maximum distance apart on the waveguide each extract a small portion of the energy from the waveguide propagating in both the clockwise (CW) and counterclockwise (CCW) directions. The lasing frequency in the CW and CCW directions is a factor of the rotation rate of the transducer, decreasing in the direction of rotation and increasing in the direction opposite to rotation. The CW and CWW radiation frequencies are heterodyned to give low frequencies proportional to rotation rate, and phase relationships which are proportional to rotational rate and number of turns of the waveguide.

3 Claims, 3 Drawing Figures

ROTATIONAL MOTION TRANSDUCER

DEDICATORY CLAUSE

The invention described herein may be manufactured, used, and licensed by or for the Government for governmental purposes without the payment to me of any royalties hereon.

CROSS REFERENCE TO RELATED APPLICATION

The instant invention employs the teachings of my earlier U.S. patent application, entitled "Closed Spiral Laser Gyro," filed July 11, 1975 and bearing Ser. No. 595,181.

BACKGROUND OF THE INVENTION

The present invention is in the field of laser gyros for measuring rotation, rotation rate, and rotation acceleration. Glass and single crystal fiber growth or manufacture has progressed remarkably during the last few years. Ring laser gyros utilizing glass or single crystal waveguide fibers are capable of solving some of the problems of conventional laser gyros. One of the problems which has proven very difficult to solve from the practical standpoint is the lock-in problem. The laser gyro operates on the principle that electromagnetic radiation propagates without regard to the motion of the media in which it is propagating. Radiation in a finite length path, therefore, takes longer to reach the far end of the path if the path is moving in the same direction as the radiation and conversely, the time is shortened if the path is moving in the opposite direction. The frequency of oscillation of a laser depends on the length of its closed path. If the path length increases slightly the frequency decreases and if the path length decreases slightly the frequency increases. In the special case of the ring laser the path length is closed by connecting the two ends of the laser instead of the practice in a standard laser where the path is closed by reflectors. The ring allows the radiation to propagate in both directions in an independent manner if the path is perfect. The problem is that a perfect path has been very difficult to construct and there is a tendency for radiation going in opposite directions to lock-in together. It is virtually impossible for the molecules in a gas laser not to cause some scattering of the radiation and consequent lock-in. Reflectors and path discontinuities can also cause radiation scattering and lock-in. These problems exist for both gaseous and solid lasers, but are avoided in a solid ring laser with a perfect crystal structure, as the instant invention. There have been several projects to develop single crystal fibers. Most of these projects were initiated to develop fiber reinforcing for such items as jet engine turbine blades. These projects were based on the knowledge that single crystal fibers are among the strongest of known materials. One of the more successful projects was carried out by Arthur D. Little, Inc., based on pulling crystals from a laser created melt-point on solid crystal material. This technique has allowed the pulling of zone-refined single crystal fibers of considerable lengths. Fibers of less than 50 microns diameter with less than 5 microns variations are typical. Work is in progress to pull such fibers to 5 microns diameter and many meters long. By cladding these fibers with a dielectric layer with a slightly lower index of refraction they become single mode waveguides. Single mode waveguiding follows the relationship:

$$\frac{2\pi a}{\lambda}(n_1^2 - n_2^2)^{\frac{1}{2}} < 2.4$$

in which:
 $a$ = the radius of a single crystal fiber,
 $\lambda$ = the wavelength of the radiation in air,
 $n_1$ = the index of refraction of the fiber,
 $n_2$ = the index of refraction of the cladding.

Utilizing a Nd:YAG laser crystal (1.06 micron = $\lambda$) with an index of refraction $n_1$ of 1.83 and a cladding, $n_2$, of 1.83 minus 0.1%, the fiber diameter should be less than 5 microns. Single crystals of this type are becoming available. Glass waveguide technology has progressed considerably more than has single crystal waveguide technology. Losses below 2db per kilometer and length to 10 kilometer have been reported. The instant invention is particularly directed to single crystal waveguide because it is anticipated that they will eventually be superior for fiber waveguide ring lasers. Theoretically, the losses and scattering in a single crystal fiber waveguide can be lower than glass, which will help solve the lock-in problem. Also, some single crystals such as Nd:YAG are effective Faraday rotators in axial magnetic fields. Variation of such a magnetic field changes the effective lengths of the opposite directions of propagation of energy in a ring laser, even with zero rotation of the laser. The field may be adjusted manually or automatically to provide a fixed off-set, so that $F_1 = F_2$ = some constant frequency, with or without rotation. This technique is a possible solution to the problem of lock-in.

SUMMARY OF THE INVENTION

A ring laser made by joining the ends of a single crystal fiber optical waveguide. The ends are joined to minimize any reflections at the junction and the ring is a whole multiple of a wavelength long. Rotating the ring laser causes the apparent path length to increase in the direction of rotation and decrease in the reverse direction. This apparent change in the lengths of the two paths (clockwise, CW, and counterclockwise, CCW) causes the laser frequency in each path to change. One frequency goes up and the other down and the difference $\Delta f$ is a $$\frac{2r}{\lambda} \Omega$$

where $r$ is the radius of the ring, $\lambda$ is the wavelength in the ring of the frequency of the laser at rest, and $\Omega$ is the rotation rate.

The radiation at one point on the ring is tapped for both the CW and CCW propagation so that they can be radiated on a heterodyne detector where the beat or heterodyne frequency is developed. Evanescent coupling of an external fiber waveguide to the ring laser is one technique and makes for easy coupling of the CW and CCW radiation at the proper angles into the detector. A second point on the ring laser, preferably opposite the first tap, is used to develop a second heterodyne frequency which is equal to the first but phase shifted from it by the path length around the circle of the waveguide. Rotating the ring causes the apparent path length between the two taps to change. Rotation in the CW direction causes the apparent radiation path length in the CW direction to increase and in the CCW direction to decrease which in turn causes the relative heterodyne phases to change by a time factor of $2A\Omega/C^2$. An increase in rotation rate causes the 2 heterodyne frequencies and their time phase relationship to proportionally increase. The laser may have N loops, where $N > 1$. The number of loops does not affect the heterodyne frequencies because they are a factor only of the radius of the loops, but the time phase delay between the heterodyne frequencies increases directly with the number of loops.

DETAILED DESCRIPTION OF THE PREFERRED EMBODIMENTS

Figure 1:
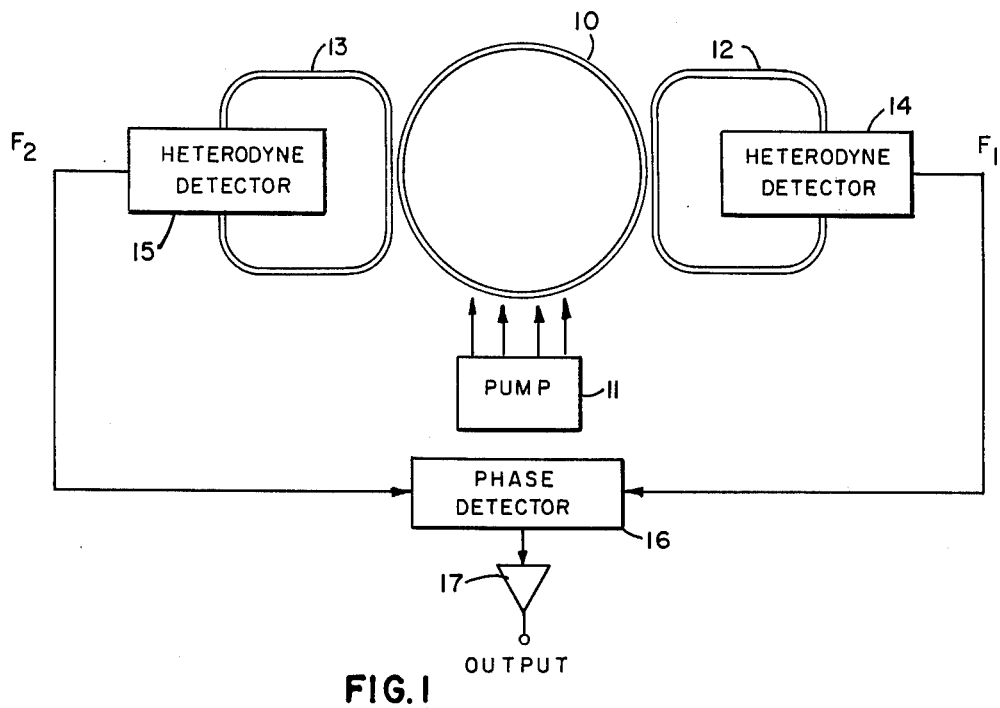
FIG. 1 shows an embodiment of the invention wherein a single, substantially planar, laser loop is used.

The invention may be best understood by referring to the drawings, in which FIG. 1 shows a single-turn fiber optical waveguide 10 with its ends (not shown) joined in a non-reflective manner, as by fusing. The waveguide material may be a single crystal or glass which has been made suitable for lasing. For example, if ytterbium iron garnet (YAG) is used it might be dopped with neodymium (Nd). A cladding is grown or deposited on the outside of the fiber which has a slightly lower index of refraction and is also transparent to the laser pump radiation. Adjacent to 10 is pump 11 for introducing pumping electronmagnetic energy to 10. The energy introduced by pump 11 will thus induce lasing in 10, with the frequency of the lasing energy being dependent on ring path length. For a circular ring, single mode waveguiding follows the relationship.

$$\frac{2\pi a}{\lambda}(n_1{}^2 - n_2{}^2)^{\frac{1}{2}} < 2.4$$

With Nd:YAG laser crystal of diameter less than 5 microns, and $n_1$ of 1.83, $n_2$ of 1.83 minus 0.1%, a $\lambda$ of 1.06 micron is obtained.

A portion of the laser energy in 10 is coupled to waveguides 12 and 13 feeding heterodyne detectors 14 and 15. The coupling may be evenescent or otherwise. Heterodyne or difference frequencies $F_1$ and $F_2$ are equal and related to rotation rate by:

$$F_1 = F_2 = \frac{4A\Omega}{\lambda L}$$

where A is the cross-sectional area of the laser gyro, L is the circumference or distance around the turn, $\Omega$ is the rotational rate, and $n$ is the index of refraction of waveguide 10. Signals $F_1$ and $F_2$ are routed to phase detector 16 and then to an amplifier 17. The time phase relationship between $F_1$ and $F_2$ is $\Delta t$ and $$\Delta t = \frac{2A\Omega}{C^2} \cdot \frac{\text{Laser frequency}}{\text{heterodyne frequency}}$$

where C is the freespace velocity of light.

Figure 2:
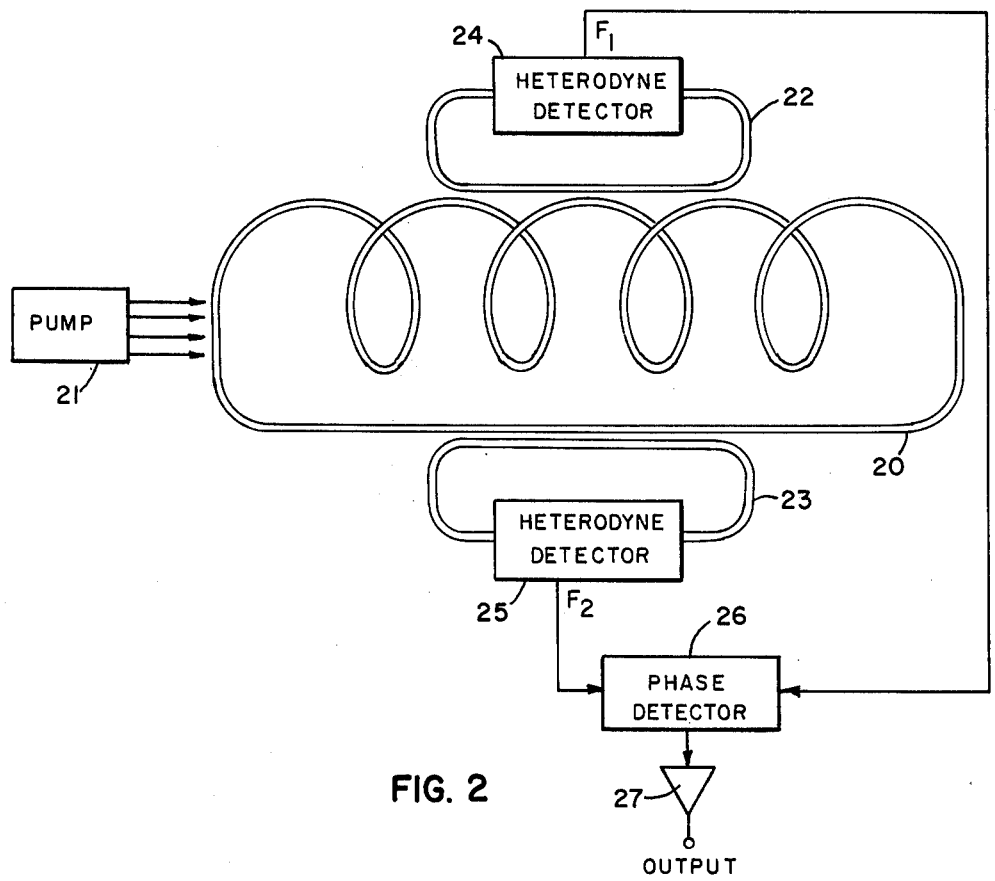
FIG. 2 shows an embodiment of the invention wherein a multiturn loop, in the form of a closed-end helix, is used.

FIG. 2 shows another embodiment of the invention wherein the laser fiber is formed into a helix of N turns. This figure includes fiber waveguide 20, pump 21, waveguides 22 and 23 and heterodyne detectors 24 and 25. As in FIG. 1, a portion of the laser energy in 20 is coupled to waveguides 22 and 23, with 22 and 23 feeding respective detectors 24 and 25. Outputs $F_1$ and $F_2$ of 24 and 25 are applied to phase detector 26, with the output of 26 feeding amplifier 27. In this embodiment, $$F_1 = F_2 = \frac{4A\Omega}{\lambda L},$$

where L equals the distance around waveguide 20 (its length) and the other symbols are as previously stated.

$$\Delta t = \frac{2A\Omega N}{C^2}$$

where N = the number of waveguide turns, and the other symbols are as before.

Although FIGS. 1 and 2 show the pump as being external to the waveguide loop(s) it should be understood that the pump might be within the loop. For example, waveguide 20 may be wound on a transparent cylinder with the pump in the cylinder. Also, a covering may be provided to reflect any pumping radiation passing through the loop(s) back to the loop(s).

A specific example of a transducer built in accordance with the invention could be built using a Nd:YAG single fiber waveguide with 1000 turns; each turn 1 meter in circumference. Evanescent coupling loops are placed a maximum distance apart along the laser waveguide. The turns are suitably spaced so as to insure that there is no cross coupling. Lasing wavelengths with the gyro at rest (no rotation) would be at 1.06 freespace micrometers in both the clockwise (CW) and counterclockwise (CCW) directions. Resolution calculations are as follows:

Circumference of gyro $= L = \pi D = 1$
$D = 2r = 1/\pi = 0.3183098861$ meters
$A = \pi r^2 = 0.0795774715$ sq. meters Heterodyne frequency $= F_1 = F_2 = \frac{4A\Omega}{\lambda L} =$ $$0.300292345 \times 10^6 \, \Omega$$

where $n = 1.83$ for Nd:YAG and $\Omega = $ rotation rate (for circular ring laser this equation becomes $2r\Omega/\lambda$ (where $r$ is the radius).

The CW and CCW differential frequency or heterodyne frequency is a direct function of area and an inverse function of length around the loop or loops, therefore, adding more loops does not change the differential frequency. It does, however, increase the phase shift or time delay $\Delta t$.

$$\Delta t = \frac{2A\Omega \times N}{C^2}$$

where N is the number of loops or turns.

For a rotation rate of $10^{-3}$ rad. per sec. and $10^3$ turns, $$\Delta t = \frac{2 \times .0795774715 \times 10^{-3} \times 10^3}{(3 \times 10^8)^2} =$$

$$1.768388254 \times 10^{-18} \text{ sec and } F_1 = F_2 = 300.3 \text{ Hz.}$$

Since a phase shift at the laser frequency creates a corresponding shift in the heterodyne phase, the phase shift between $F_1$ and $F_2$ is $$1.768388254 \times 10^{-18} \times \frac{3 \times 10^8/1.06 \times 10^{-6}}{300.3} =$$
$$1.667 \times 10^{-6} \text{ seconds.}$$

That is, a relative phase shift at the laser frequency of $1.76838854 \times 10^{-18}$ sec. causes a phase shift of 1.667 microseconds between $F_1$ and $F_2$. A good 100 MHz counter will digitize this phase shift to one part of 166.7 directly and can replace the phase detector.

The outputs of amplifiers 17 or 27 may be digitized in order to easily extract the information therein. Alternatively, phase detectors 16 and 26 and respective amplifiers 17 and 27 (and any digitizers, if used) may be replaced by an accurate 100 MHz counter. Such a counter would directly digitize the phase shift between $F_1$ and $F_2$ to one part in 166.7. A one milliradian per second rotation rate is, thereby, resolved to one part 166.7. Integrating the rotational rate gives the magnitude of rotation and differentiating gives rotational acceleration.

Figure 3:
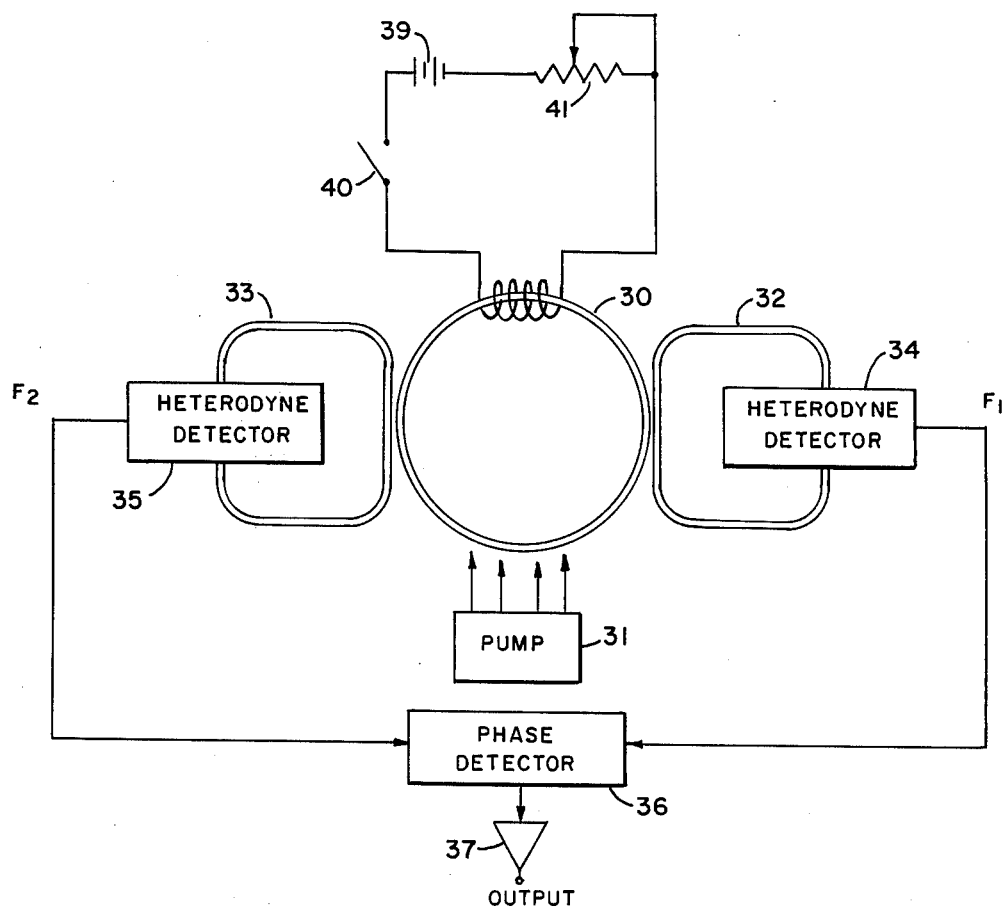
FIG. 3 shows another embodiment of the invention wherein a portion of the laser loop is a Faraday rotator.

The embodiment of FIG. 3 is similar to that of FIG. 1, but with the addition of electrical solenoid 38 wound around optical waveguide 30. This solenoid may be energized by battery 39 via switch 40. Variable resistor 41 allows the current through 38 to be varied. Nd:YAG, when subjected to an axial magnetic field, acts as a Faraday rotator. Such a rotator in a laser gyro causes an apparent path length difference in the two directions of laser energy propagation. The apparent path length is varied by variations in current in solenoid 38. Thus, the tendency for mode locking between opposite directions of energy propagation is reduced. Elements 31–37 correspond respectively to elements 11–17 of FIG. 1 and perform corresponding functions. Obviously a similar scheme for a Faraday rotator could be used in the FIG. 2 embodiment of the invention.

Although specific embodiments of the invention have been shown and described, other embodiments may be obvious to ones skilled in the art, in light of this invention disclosure. For example, the number of turns of the waveguide are not limited to those numbers shown in the drawings, but may be between one and five turns, or greater than five.

I claim:

1. A rotational motion transducer including a closed-loop, optical waveguide laser, and means for detecting frequency and phase differences for opposite directions of rotation of radiation in said laser; said means for detecting including a pair of heterodyne detectors, a phase detector having inputs fed by said heterodyne detectors, and means for coupling a portion of the radiation in said laser to said heterodyne detectors; said means for coupling being comprised of two different portions, said portions being coupled to opposite places on the loop of said laser, said portions being further connected to respective ones of said detectors.

2. The transducer as recited in claim 1 further including means for producing an axial magnetic field in said laser.

3. The transducer as recited in claim 2 wherein said means for producing includes means for varying said magnetic field.

* * * * *

UNITED STATES PATENT AND TRADEMARK OFFICE
CERTIFICATE OF CORRECTION

PATENT NO. : 4,039,260
DATED : August 2, 1977
INVENTOR(S) : Charles M. Redman

It is certified that error appears in the above-identified patent and that said Letters Patent are hereby corrected as shown below:

In the ABSTRACT, line 19, change "CWW" to read --CCW--.

Column 2, line 5, should read -- $\frac{2\pi a}{\lambda} (n_1^2 - n_2^2)^{\frac{1}{2}} < 2.4$ --;

line 47, delete "a"; and lines 48-49, should read -- $\frac{2r}{\lambda} \Omega$ --.

Column 4, line 66, change "10-$^{18}$" to read --$10^{-18}$--.

Signed and Sealed this

*Twenty-second* Day of *November 1977*

[SEAL]

Attest:

RUTH C. MASON
*Attesting Officer*

LUTRELLE F. PARKER
*Acting Commissioner of Patents and Trademarks*